United States Patent [19]

Jencek

[11] Patent Number: 4,779,799

[45] Date of Patent: Oct. 25, 1988

[54] EXTENDIBLE NOZZLE

[75] Inventor: Premysl Jencek, Chatsworth, Calif.

[73] Assignee: Rockwell International Corporation, El Segundo, Calif.

[21] Appl. No.: 26,405

[22] Filed: Mar. 16, 1987

[51] Int. Cl.$^4$ ............................................. F02K 1/09
[52] U.S. Cl. ................................. 239/265.19; 60/271; 74/89.15
[58] Field of Search ................. 60/228, 229, 232, 271, 60/242, 236; 239/265.43, 265.33, 265.11, 265.19; 74/89.14, 89.15

[56] References Cited

U.S. PATENT DOCUMENTS

| | | | |
|---|---|---|---|
| 3,346,186 | 10/1967 | Fulton et al. | 239/265.33 |
| 3,482,783 | 12/1969 | Nebiker et al. | 239/265.15 |
| 3,596,465 | 8/1971 | Paine et al. | 239/265.43 |
| 3,637,140 | 9/1970 | Palovchik | 239/265.43 |
| 3,711,027 | 1/1973 | Carey | 239/265.19 |
| 3,951,342 | 4/1976 | Baker, Jr. | 239/265.33 |
| 4,162,040 | 7/1979 | Carey | 239/265.33 |
| 4,272,956 | 6/1981 | Lamere et al. | 60/242 |
| 4,383,407 | 5/1983 | Inman | 60/271 |
| 4,387,564 | 6/1983 | Carey | 60/242 |
| 4,480,437 | 11/1984 | Gauge | 60/271 |
| 4,489,889 | 12/1984 | Inman | 239/265.33 |

Primary Examiner—Andres Kashnikow
Assistant Examiner—Chris Trainor
Attorney, Agent, or Firm—H. Fredrick Hamann; Harry B. Field; Lawrence N. Ginsberg

[57] ABSTRACT

An apparatus and method for continuous deployment and stowage of an extendible nozzle 12 of a rocket engine. One end of the heat-resistant sheet metal extendible nozzle 12 is fixedly attached to the lower end of the fixed nozzle 16 of the engine. In the stowed position the extendible nozzle 12 is turned upward and outward so that it circumferentially surrounds the fixed nozzle 16. Axial support means 18 are included which provide support for the extendible nozzle 12 in the stowed position. Deployment means 24 is disposed within a space 34 formed between the extendible nozzle 12 and the fixed nozzle 16 for engaging the extendible nozzle 12 where it is folded upward. The deployment means 24 is positioned so as to unfold the extendible nozzle 12 as the deployment means 24 is advanced downwardly. When the extendible nozzle 12 is unfolded from a stowed position, the deployment means 24 initially engages the end of the extendible nozzle 12 which is attached to the fixed nozzle 16 and then partially unfolds the extendible nozzle 12 as the deployment means 24 moves downwardly engaging intermediate portions of the extendible nozzle 12. This partial unfolding provides high efficiency operation of the rocket engine at certain altitudes. The extendible nozzle 12 is fully deployed by advancing the deployment means 24 to the other end of the extendible nozzle 12 and thus provides high efficiency operation where the highest expansion ratio is desired.

13 Claims, 6 Drawing Sheets

EXTENDIBLE NOZZLE

BACKGROUND OF THE INVENTION

This invention relates to an apparatus and method for continuous deployment and stowage of an extendible nozzle of a rocket engine.

Rocket engines for vehicles operating around space stations, orbital transfer vehicles, and engines for high-orbit satellites use, during their operation, high expansion-ratio nozzles having greater length than the inner volume of their carrier allows. Therefore, the engine overall length must be reduced during transport, and then extended for operation. Furthermore, for vehicles which will travel at varying altitudes, it is not only desirable to simply deploy the extendible nozzle but it is also useful to be able to deploy the extendible nozzle to an optimal length depending on the altitude for high efficiency operation of the rocket engine. Several types of extendible nozzles have been disclosed; however, an effective adjustability feature which would allow for partial deployment of the extendible nozzle and retraction of the extendible nozzle back to a stowed position is lacking in prior art nozzle extensions.

For example, the present applicant has filed co-pending U.S. application Ser. No. 06/644,412, now U.S. Pat. No. 4,706,886, entitled, "Extendible Rocket Engine Nozzle", which discloses a telescoping sleeve section around the fixed nozzle of the rocket engine. The sleeve is driven to form the extendible nozzle. The extendible sleeve is advanced by inflating a pressure vessel which drives a support plate. The support plate supports radial-extending locking arms which engage the rear end of the extendible nozzle. After the nozzle has been extended, a second pressure vessel and latching mechanism is utilized to jettison all nozzle-extending and deployment components out of the extended nozzle.

The present applicant is also a co-inventor of the subject matter claimed in U.S. Pat. No. 4,638,947 entitled, "Pneumatic Bag Deployment of Folded Nozzle Extensions", which uses an inflatable bag to extend an extendible folded nozzle. The inflatable bag is located in the fixed nozzle and is jettisoned prior to the rocket engine being fired.

U.S. Pat. No. 3,711,027 issued to L. F. Carey, entitled, "Extendible Nozzle for Rocket Engines", discloses use of a frustoconical-shaped member formed of thin and light weight convoluted ductile sheet material, to comprise the engine nozzle wall structure which is adapted to be unrolled in crease-free manner. The device is arranged in combination with a temporary cover member which is so attached to the nozzle exit end portion thereof as to seal therein gas pressure sufficient to cause the nozzle structure to unroll in its extended configuration. The cover is then jettisoned so as to operatively open the nozzle.

U.S. Pat. No. 4,480,437, issued to P. D. Gauge, entitled, "Unfoldable Device for Extenting the Nozzle of a Rocket Engine", discloses a device which consists of a frustoconical-shaped skirt formed by a stack of tube rings or coils welded to one another. The tube has a cross section flattened in the direction of the stack and incorporates a pyrotechnic device on the inside. The pyrotechnic device generates sufficient pressure to increase dimension of the tube in the direction of the stack. The effect of this pressure is to unfold the nozzle extension.

Although the Gauge '437 device can be inflated after initial rocket engine firing, it is limited to a single extension and cannot be stowed after this application. Thus, as in the other previously discussed references, nozzle deployment is non-repeatable and the nozzle is non-stowable after initial deployment.

U.S. Pat. No. 3,951,342, issued to W. H. Baker, Jr. entitled, "Entendible Nozzle for a Rocket Motor or the Like" discloses an extendible nozzle consisting of elongated petals representing strips of a conically shaped structure connected by means of hinges to the exit portion of the fixed nozzle. The Baker, Jr. extendible nozzle utilizes linear actuators to extend the nozzle. The acutators are released to retract the extendible nozzle with the assistance of a spring. Although the Baker, Jr. extendible nozzle is retractable, partial deployment does not provide utility because spaces remain between the petals until the nozzle is fully deployed.

OBJECTS AND SUMMARY OF THE INVENTION

The principal object of the invention is, therefore, to provide an extendible nozzle which is deployable to a desired length and therefore can operate optimally at different orbits.

Another object is to provide an extendible nozzle which can be retracted for stowage and future use.

Other objects, advantages and novel features of the present invention will become apparent from the following detailed description of the invention when considered in conjunction with the accompanying drawing.

In its broadest aspects, the present invention comprises a flexible, heat-resistant, sheet metal extendible nozzle with one end which is fixedly attached to the lower end of the fixed nozzle of the engine. In the stowed position the extindible nozzle is turned upward and outward so that it circumferentially surrounds the fixed nozzle. Axial support means are included which provide support for the extendible nozzle in this stowed position. Deployment means is disposed within a space formed between the extendible nozzle and the fixed nozzle for engaging the extendible nozzle where it is folded upward. The deployment means is positioned so as to unfold the extendible nozzle as the deployment means is advanced downwardly. The deployment means includes control means for regulating the axial position of the deployment means and radial extension means for providing adaptation of the deployment means to varying diameters along the length of the extendible nozzle. When the extendible nozzle is unfolded from a stowed position, the deployment means initially engages the end of the extendible nozzle which is attached to the fixed nozzle and then partially unfolds the extendible nozzle as the deployment means moves downwardly engaging intermediate portions of the extendible nozzle. This partial unfolding provides high efficiency operation of the rocket engine at certain altitudes. The extendible nozzle is fully deployed by advancing the deployment means to the other end of the extendible nozzle and thus provides high efficiency operation where the highest expansion ratio is desired.

In its narrower aspects, the deployment means includes a plurality of radially spaced advancing roller assemblies. Each roller assembly has a roller positioned to roll along the outer surface of an unfolded portion of the extendible nozzle within the space between the outer surface and any unfolded portion of the extendible nozzle. The rollers unfold the extendible nozzle as they roll downward along this outer surface. The axial support means comprises a motor-driven cable and drum assembly. The end of the cable connects to the end of the extendible nozzle.

Other objects, advantages and novel features of the present invention will become apparent from the following detailed description of the invention when considered in conjunction with the accompanying drawing.

DETAILED DESCRIPTION OF THE INVENTION

Figure 1:
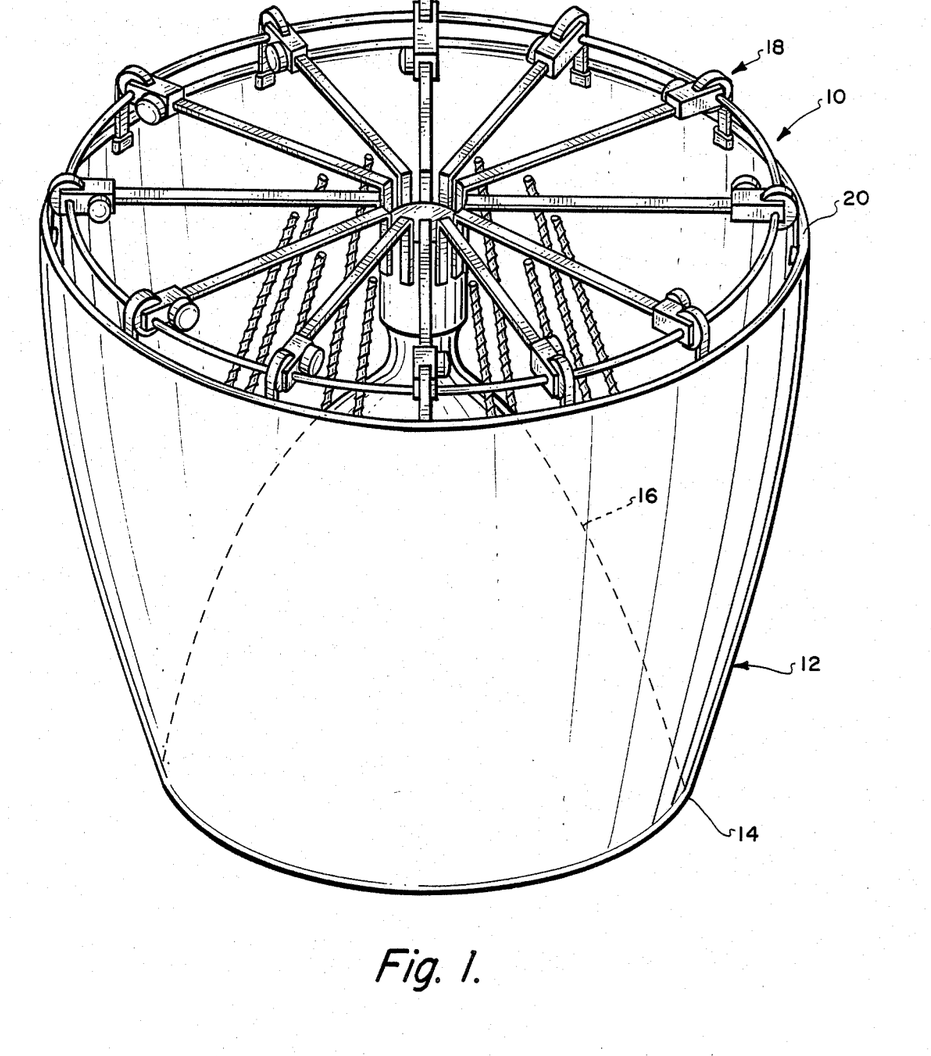
FIG. 1 is a perspective view of the extendible nozzle assembly of the present invention, in a stowed configuration.

Referring to the drawings and to the characters of reference marked thereon, FIG. 1 illustrates the extendible nozzle assembly, generally designated 10 of a rocket engine in a stowed configuration prior to being extended. Extendible nozzle portion 12 is welded or otherwise fixedly attached to the exit port at the lower end 14 of a conically or bell-shaped divergent fixed nozzle 16. The extendible nozzle 12 is fabricated of flexible, heat-resistant, sheet metal material such as Columbium alloy. In this stowed position, the extendible nozzle 12 is turned outwardly and upwardly so that it circumferentially surrounds the fixed nozzle 16. Stowing allows valuable space to be saved in the transport carrier during transportation. The extendible nozzle 12 is axially maintained in this position by axial support means generally designated 18 and discussed in detail below.

Figure 2:
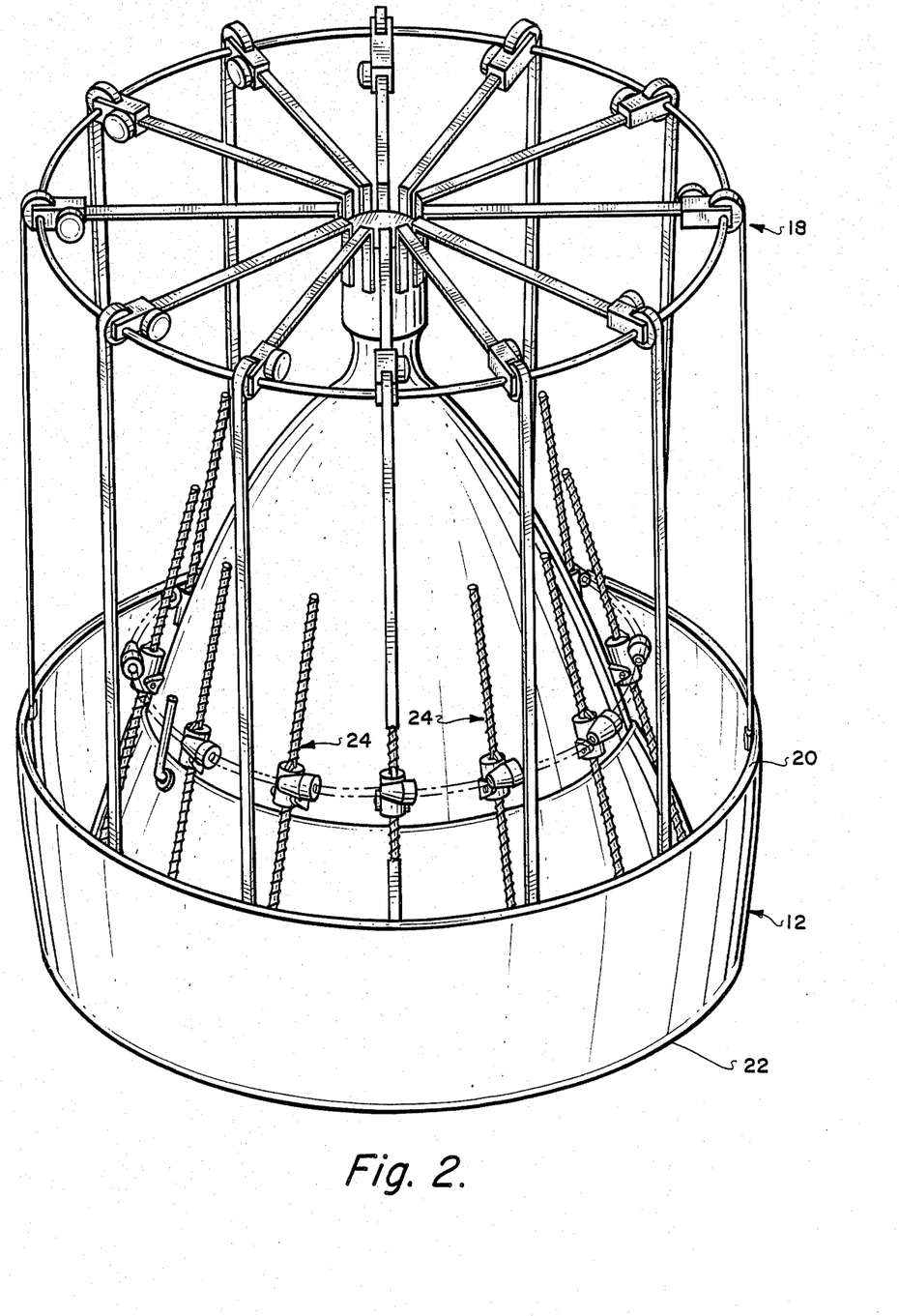
FIG. 2 is a perspective view of the extendible nozzle assembly, partially deployed.

When the rocket engine is used, the extendible nozzle may be partially deployed, for example, to the position shown in FIG. 2. The optimal position depends on the rocket's orbital altitude. The end portion 20 of the extendible nozzle 12 is, as in the stowed position, supported by axial support means 18. The crease 22 where the extendible nozzle 12 is folded upward is formed by deployment means 24 in a manner discussed in detail below.

Figure 3:
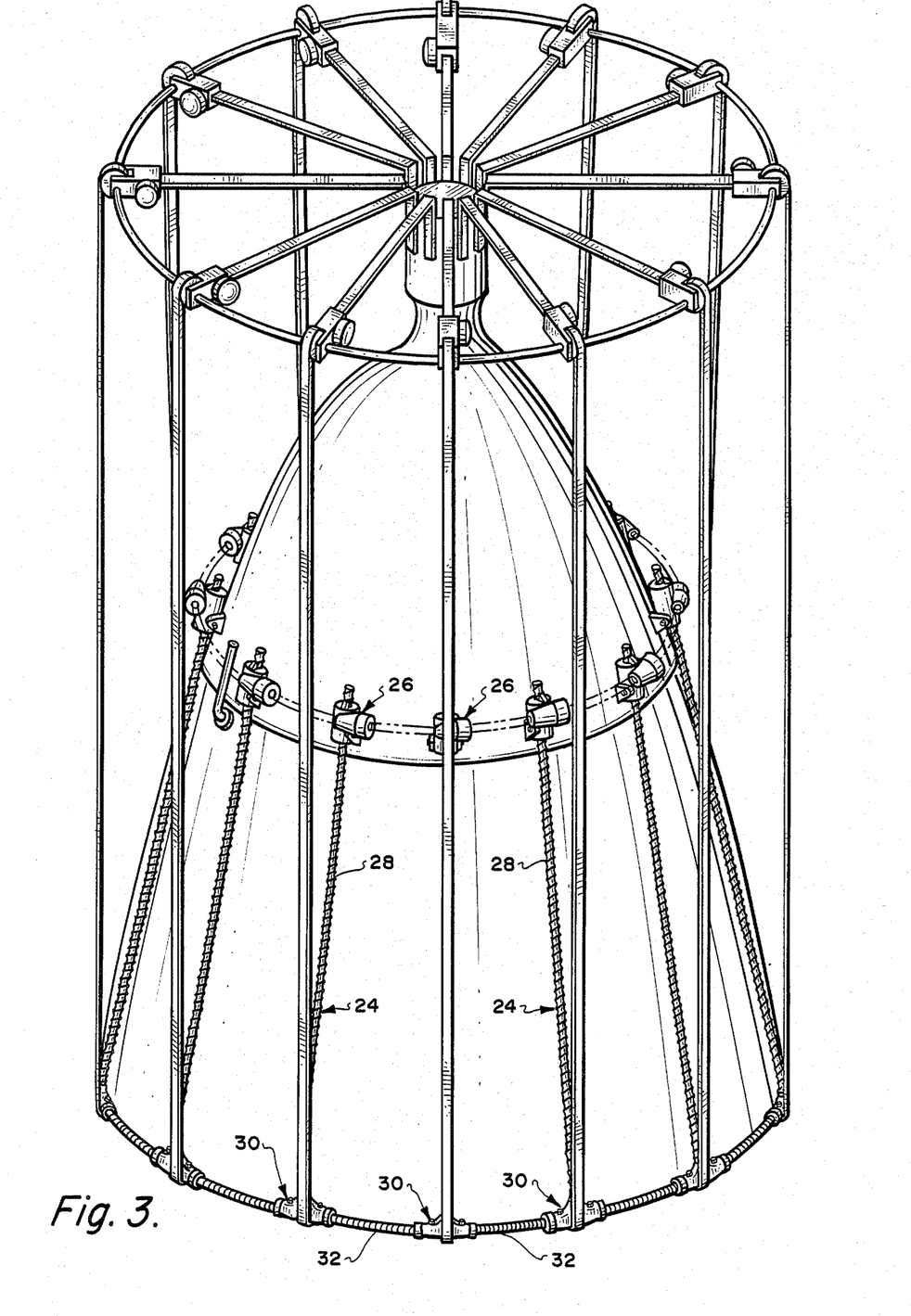
FIG. 3 is a perspective view of the extendible nozzle assembly, fully deployed.

FIG. 3 shows the extendible nozzle 12 fully deployed to achieve the greatest possible expansion ratio. As can be seen in this figure, the deployment means 24 includes a plurality of radially spaced driving units 26 for actuating ball screws 28. Each ball screw 28 terminates with a roller assembly 30. Each roller assembly is linked to an adjacent roller assembly 30 by circumferentially spaced springs 32.

Figures 4, 5:
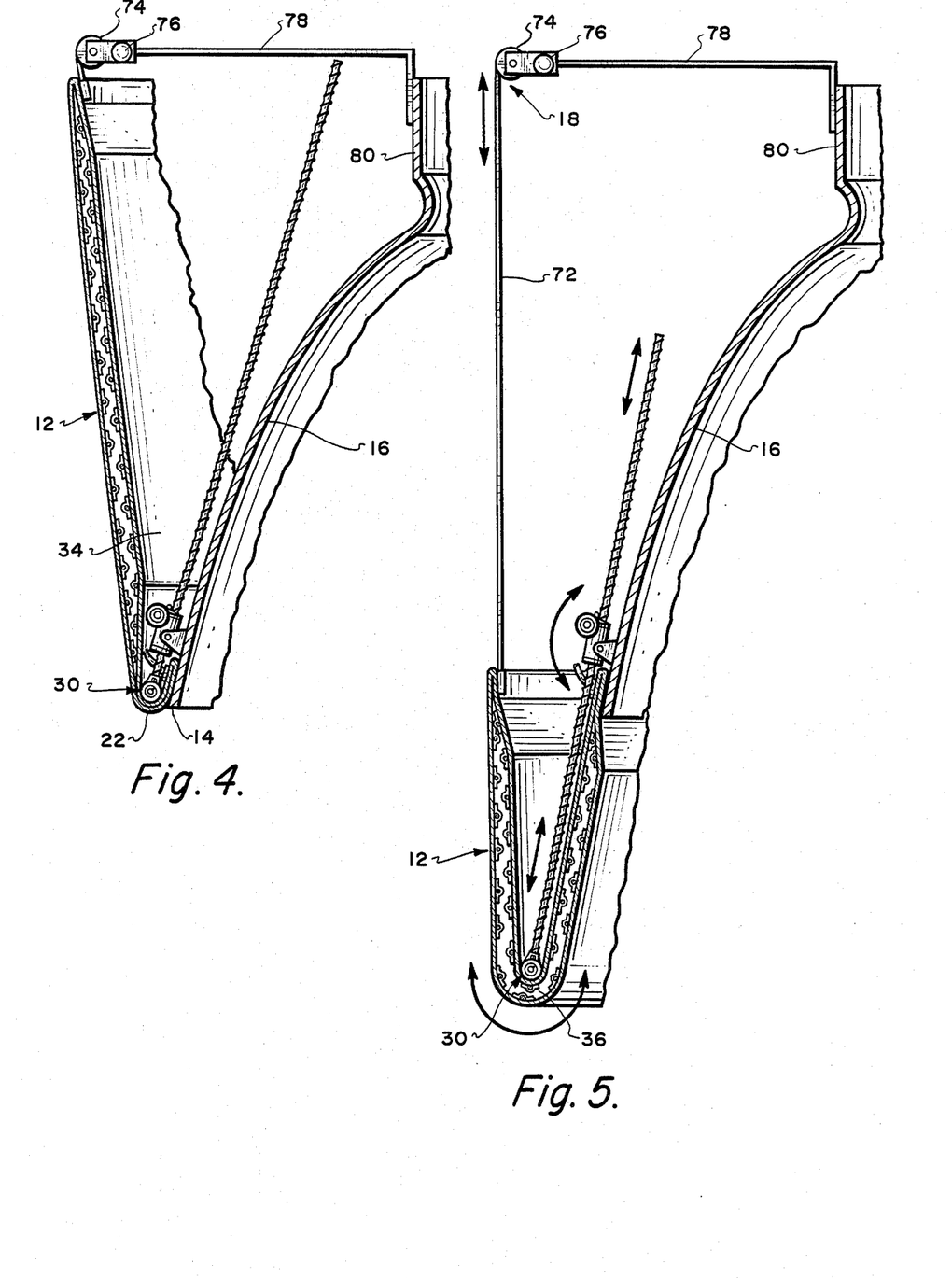
FIG. 4 is a schematic cross-sectional illustration of the extendible nozzle assembly in a stowed configuration.
FIG. 5 is a schematic cross-sectional illustration of the extendible nozzle assembly, partially deployed.

Referring now to FIG. 4, prior to deployment of the extendible nozzle, each roller assembly 30 is located adjacent the lower end 14 of the fixed nozzle 16. Each roller assembly 30 is disposed within the space 34 formed between the extendible nozzle 12 and the fixed nozzle 16 and is therefore positioned to unfold the extendible nozzle 12 as it is advanced downwardly.

FIG. 5 illustrates partial deployment of the extendible nozzle 12. In FIG. 5 the roller assembly 30 is engaging an intermediate portion 36 of the extendible nozzle 12.

Figures 6, 7, 10:
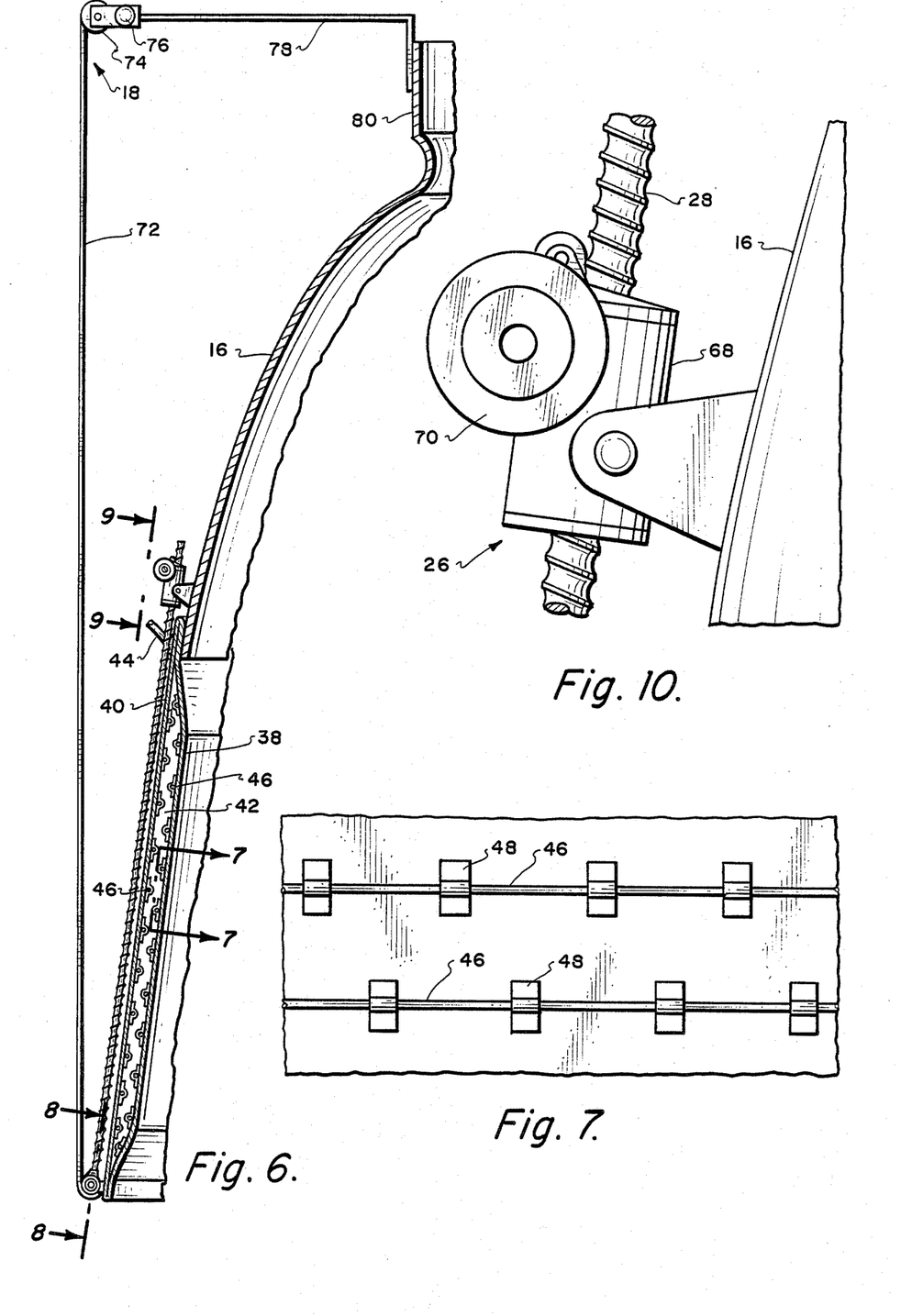
FIG. 6 is a schematic cross-sectional illustration of the extendible nozzle assembly, fully deployed.
FIG. 7 is a schematic illustration of the extendible nozzle taken along lines 7—7 in FIG. 6 and shown projected on a flat surface.
FIG. 10 is a side view of the driving unit taken along line 10—10 in FIG. 9.

A cross-sectional view of the fully deployed extendible nozzle 12 is shown in FIG. 6. The extendible nozzle 12 is preferably layered and includes a leak-proof inner sheet 38 of sheet metal and a leak-proof outer sheet 40 of sheet metal. The space 42 formed between the inner and outer sheets 38,40 is gas pressurized thereby providing thermal insulation of the deployment means 24 from the hot combustion gases. Gas feeders 44 are provided for introducing pressurizing gases into space 42.

As shown in FIG. 7, the extendible nozzle 12 includes axially spaced wire reinforcing rings 46 which extend circumferentially about the extendible nozzle 12. The reinforcing rings 46 provide radial support for the extendible nozzle 12 thereby maintaining its desired shape. Adhesive metallic strips 48 or other adhesive means may be used to attach the reinforcing rings 46 to the inner and outer sheets 38,40.

Figure 8:
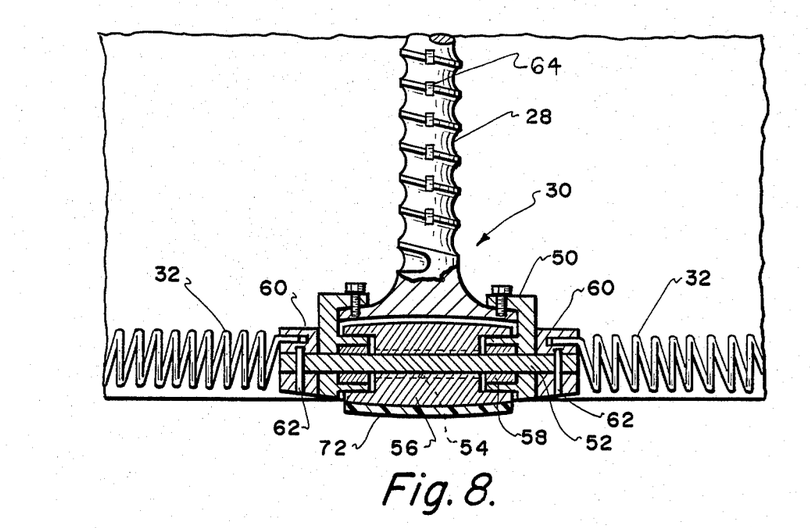
FIG. 8 is a schematic illustration of a roller assembly taken along line 8—8 in FIG. 6.

FIG. 8 is an enlarged view of a roller assembly 30. The ball screw 28 is bolted, welded or otherwise rigidly attached to a casing 50. The casing 50 has an opening therethrough for a shaft 52 with a spline 54. The shaft extends through the center of a roller 56 equipped with a mating spline. Thus, the shaft 52 and roller 56 rotate together. Needle bearings 58 facilitate rotation of the shaft 52 relative to the casing 50. The ends of the shaft 52 are capped by driver heads 60. Pins 62 fix the rotation of the driver heads 60 with the shaft 52. The circumferentially spaced springs 32 connect the various roller assemblies 30 together and therefore provide radial extension of the deployment means 24 and an even unfolding of the extendible nozzle 12.

Figure 9:
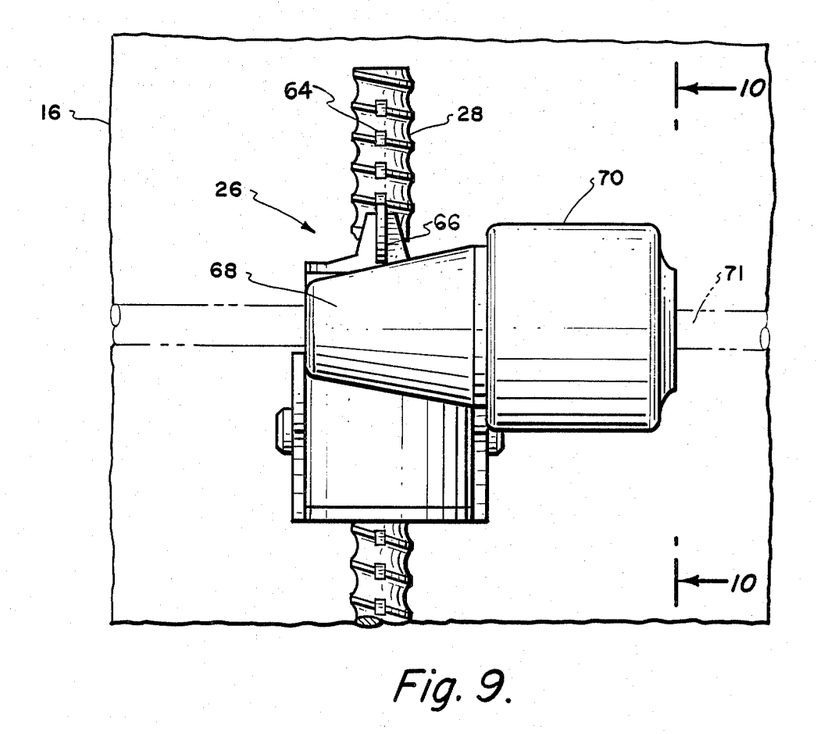
FIG. 9 is a schematic illustration of a driving unit taken along line 9—9 in FIG. 6.

FIGS. 9 and 10 are enlarged views of a driving unit 26. Each driving unit 26 includes a housing 68 attached to the fixed nozzle 16. The housing 68 contains a rotatable ball nut (not shown) which is controlled by a reversible motor 70. Synchronization of the movement of ball screws 28 is necessary and may be accomplished using any conventional methods. For example, synchronized step motors may be utilized or adjacent driving units 26 may be connected together by a flexible shaft 71 in order to synchronize the motion of the driving units 26. Each ball screw 28 contains a longitudinal groove 64 which restricts rotation of the ball screw 28 by engagement with a free-rotating wheel 66 connected to housing 68.

Referring back to FIGS. 5 and 6, the extendible nozzle 12 may be retracted by manipulation of the axial support means 18. The axial support means 18 comprises a plurality of cables or belts 72 and drums 74 which are each controlled by a motor 76. The drums 74 are connected by arms 78 to the combustion chamber 80 of the rocket engine.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An extendible nozzle assembly for a rocket engine comprising:
    a flexible, heat-resistant, sheet metal extendible nozzle including a first end portion adapted to be fixedly attached to an exit port at the lower end of a fixed nozzle of the rocket engine, a second end portion comprising the discharge end of said extendible nozzle and intermediate portions located between said first end portion and said second end portion, said extendible nozzle further including reinforcing means comprising axially spaced rings extending circumferentially about the extendible nozzle for providing radial support of said extendible nozzle;
    axial support means for supporting said extendible nozzle in a stowed position, in this stowed position the extendible nozzle being turned upward so that it circumferentially surrounds said fixed nozzle; and
    deployment means disposed within a space formed between the extendible nozzle and the fixed nozzle for engaging the extendible nozzle where it is folded upward and positioned so as to unfold the extendible nozzle as the deployment means is advanced downwardly, said deployment means including control means for regulating the axial position of said deployment means and radial extension means for providing adaptation of said deployment means to varying diameters along the length of the extendible nozzle, said deployment means initially engaging the first end portion of said extendible nozzle and partially unfolding said extendible nozzle as the deployment means moves downwardly engaging said intermediate portions, such partial unfolding providing high efficiency operation of the rocket engine at certain altitudes, said deployment means being totally extended by advancement of said deployment means to said second end portion thus providing high efficiency operation at other altitudes.

2. The extendible nozzle assembly of claim 1, wherein said deployment means includes a plurality of radially spaced advancing roller assemblies, each having a roller positioned to roll along the outer surface of an unfolded portion of the extendible nozzle within the space between said outer surface and any unfolded portion of said extendible nozzle, said rollers unfolding the extendible nozzle as they roll downward along said outer surface.

3. The extendible nozzle assembly of claim 2, wherein said axial support means is connected to said second end portion of the extendible nozzle and may provide upward movement of said second end portion when the extendible nozzle is either fully or partially extended, thereby providing retraction of said extendible nozzle.

4. The extendible nozzle assembly of claim 3, wherein said radial extension means includes a plurality of spaced springs extending circumferentially about the extendible nozzle, said springs linking the sides of said advancing roller assemblies.

5. The extendible nozzle assembly of claim 1, wherein said extendible nozzle is layered and comprises a leakproof inner sheet of sheet metal and a leakproof outer sheet of sheet metal surrounding said inner sheet and in contact with said deployment means, a space formed beteen said inner and outer sheets being gas pressurized thereby providing thermal insulation of said deployment means from hot combustion gases.

6. The extendible nozzle assembly of claim 5, wherein said deployment means includes a plurality of radially spaced advancing roller assemblies, each having a roller positioned to roll along the outer surface of an unfolded portion of the extendible nozzle within the space between said outer surface and any unfolded portion of said extendible nozzle, said rollers unfolding the extendible nozzle as they roll downward along said outer surface.

7. The extendible nozzle assembly of claim 6, wherein said axial support means is connected to said second end portion of the extendible nozzle and may provide upward movement of said second end portion when the extendible nozzle is either fully or partially extended, thereby providing retraction of said extendible nozzle.

8. The extendible nozzle assembly of claim 7, wherein said radial extension means includes a plurality of spaced spring extending circumferentially about the extendible nozzle, said springs linking the sides of said advancing roller assemblies.

9. The extendible nozzle assembly of claim 8, wherein said axially spaced rings comprise wire rings attached to the sheet metal.

10. The extendible nozzle assembly of claim 8, wherein said axial support means comprises a motor driven cable and drum assembly.

11. The extendible nozzle assembly of claim 6, wherein said deployment means includes:
    a plurality of housings attached to the fixed nozzle, each of said housings containing a rotatable ball nut;
    a plurality of reversible motors each for rotating a respective ball nut; and
    a plurality of ball screws each connected to a respective roller assembly and operably engaged with a ball nut for moving the roller upwardly or downwardly for deployment or retraction of said extendible nozzle.

12. A method for deploying the extendible nozzle of a rocket engine, comprising the steps of:
    providing a flexible, heat resistant, sheet metal extendible nozzle which includes a first end portion adapted to be permanently attached to an exit port at the lower end of a fixed nozzle of the rocket engine, a second end portion comprising the discharge end of said extendible nozzle and intermediate portions located between said first end portion and said second end portion, said extendible nozzle further including reinforcing means comprising axially spaced rings extending circumferentially about the extendible nozzle for providing radial support of said extendible nozzle;
    axial supporting said extendible nozzle in a stowed position, in the stowed position the extendible nozzle being folded upward so that it circumferentially surrounds said fixed nozzle;
    providing a deployment means which is circumferentially disposed within a spaced formed between said extendible nozzle and the fixed nozzle, said deployment means including radial extension means for providing adaptation of said deployment means to varying diameters along the length of said extendible nozzle, and including control means for regulating the deployment means axial position within said space; and translating said deployment means downward so that it urges the extendible nozzle where the extendible nozzle is folded upward thus unfolding the extendible nozzle, wherein translation of said deployment means to engagement with said intermediate portion provides high efficiency operation of the rocket engine at certain altitudes, and translation of said deployment means to engagement with said second end portion provides high efficiency operation at other altitudes.

13. The method of claim 12, wherein said deployment means includes a plurality of radially spaced advanced roller assemblies each having a roller which rolls along the outer surface of an unfolded portion of the extendible nozzle within the space between said outer surface and any unfolded portion of said extendible nozzle, said rollers unfolding the extendible nozzle as they roll downward along said outer surface.

* * * * *